United States Patent
Hartley (10) Patent No.: US 7,331,889 B2
(45) Date of Patent: Feb. 19, 2008

(54) APPARATUSES AND METHODS FOR CONTROLLING A VARIABLE SPEED TRANSMISSION

(75) Inventor: Dean E. Hartley, Burlington, NC (US)

(73) Assignee: Honda Motor Co., Ltd., Tokyo (JP)

( * ) Notice: Subject to any disclaimer, the term of this patent is extended or adjusted under 35 U.S.C. 154(b) by 669 days.

(21) Appl. No.: 10/751,768

(22) Filed: Jan. 5, 2004

(65) Prior Publication Data

US 2005/0148415 A1 Jul. 7, 2005

(51) Int. Cl.
*F16H 55/56* (2006.01)
*F16H 59/00* (2006.01)
(52) U.S. Cl. .............................. 474/46; 474/17; 474/19
(58) Field of Classification Search .................. 474/8, 474/12, 13–14, 17, 19, 21, 36, 37–38, 46
See application file for complete search history.

(56) References Cited

U.S. PATENT DOCUMENTS

| | | | | |
|---|---|---|---|---|
| 2,491,464 A | * | 12/1949 | Hazen | .......................... 474/21 |
| 4,322,934 A | | 4/1982 | Doi | |
| 4,653,345 A | | 3/1987 | Edwards | |
| 4,869,705 A | * | 9/1989 | Fenton | ............................ 474/8 |
| 4,924,988 A | | 5/1990 | Page | |
| 5,460,575 A | * | 10/1995 | Berto | ............................ 474/11 |
| 5,580,324 A | * | 12/1996 | Landry | .......................... 474/19 |
| 6,146,295 A | * | 11/2000 | Mor et al. | .................... 474/13 |
| 6,186,916 B1 | | 2/2001 | Blanchard | |
| 2002/0183145 A1 | | 12/2002 | Blanchard | |

FOREIGN PATENT DOCUMENTS

| | | | | |
|---|---|---|---|---|
| JP | (59-226-758 A | * | 12/1984 | .................. 474/13 |
| JP | (01-255754 A | * | 10/1989 | .................. 474/14 |
| JP | (03-265747 A | * | 11/1991 | .................... 474/8 |

* cited by examiner

*Primary Examiner*—Marcus Charles
(74) *Attorney, Agent, or Firm*—Jenkins, Wilson, Taylor & Hunt, P.A.

(57) ABSTRACT

Apparatuses and methods are disclosed for controlling a variable-speed transmission utilizing a pulley structure including first and second pulley members coupled for free rotation together about a shaft. The second pulley member can be axially movable relative to the first pulley member, and can include a pulley contact surface disposed generally opposite to the first pulley member. A coupling member is provided for communicating with the shaft to rotatably drive the shaft. The coupling member includes a coupling member contact surface disposed for selective frictional engagement by the pulley contact surface. Torque can be selectively coupled and decoupled to a transmission, as well as vary a speed of the transmission.

12 Claims, 4 Drawing Sheets

APPARATUSES AND METHODS FOR CONTROLLING A VARIABLE SPEED TRANSMISSION

TECHNICAL FIELD

The subject matter disclosed herein generally relates to variable-speed transmissions and, more specifically, to a control apparatuses and methods that can be implemented with such a transmission to operate as both a coupling mechanism and a speed-varying mechanism.

BACKGROUND ART

Many types of transmissions are capable of operating at variable speeds. Typically, a variable-speed transmission includes a means for adjusting speed in response to control by an operator using a machine comprising the transmission. One type of transmission utilizes one or more variable-pitch pulleys to enable speed variation. As generally known to persons skilled in the art, a variable-pitch pulley typically includes two plates defining a groove therebetween for carrying a belt driven by a motor. One of the plates is axially movable relative to the other, such as along a central hub, while the other plate remains fixed in position to a shaft about which the plates of the pulley rotate. Cams or other means are employed to cause the movable plate to move toward or away from the other plate, such as by changing the tension in the belt, thereby varying the pitch of the pulley (i.e., widening or narrowing its groove) and enabling the belt to move away from or toward the shaft (i.e., running the belt at a shallow or deep position within the groove). The speed of the shaft changes in response to the change in position of the belt within the groove defined between the plates. Examples of the use of variable-pitch pulleys are disclosed in U.S. Pat. Nos. 4,322,934; 4,653,345; 4,924,988; and 6,186,916; and U.S. Patent Application Pub. No. US 2002/0183145.

While variable-pitch pulleys often perform well in cooperation with transmissions for the conventional purpose of varying speed between minimum and maximum values, such pulleys are not capable of providing a complete and/or effective engagement or disengagement of the torque supplied to the transmission. In one approach disclosed in U.S. Pat. No. 4,322,934, a transmission is powered by a motor and includes a belt-driven variable-pitch pulley. The motor is, in a sense, "disengaged" from the transmission by decreasing tension on the belt driving the variable-pitch pulley to such a degree that the belt can no longer drive the pulley. This approach can cause the belt to prematurely wear due to slippage on the surfaces of the pulley and the repeated cycling of the belt between extreme tensioned and relaxed states. Moreover, additional driving components such as extra pulleys and belts are required so that other operative components driven by the motor, such as blades in the case of a lawnmower, are not affected by the slackening of the variable-pitch pulley's belt.

In other approaches, the function of engagement/disengagement has required the use of a separate transmission component dedicated for that purpose, such as a cone clutch, dog clutch, ratchet, brake, pressure plate or friction disk assembly, or the like. Moreover, separate control mechanisms have often been required to enable an operator to control engagement/disengagement and speed variation. Examples include transmissions disclosed in U.S. Pat. No. 6,186,916 and U.S. Patent Application No. US 2002/0183145. In these two references, the pitch of a variable-pitch pulley is changed by rotating a cam device, while maintaining tension in the belt driving the pulley. Such transmissions require a separate clutch to effect engagement and disengagement.

In another example, U.S. Pat. No. 4,653,345 likewise discloses a transmission in which a variable-pitch pulley is adjustable by rotating a cam device. In addition, the transmission of U.S. Pat. No. 4,653,345 includes a separate, internal shifting assembly disposed within the transmission's housing, remotely from the variable-pitch pulley. The shifting assembly switches the transmission between driving and neutral states. A control lever is connected both to the rotatable cam device and, through a linkage assembly, to the shifting assembly. Rotation of the control lever actuates both the cam device and the shifting assembly. The variable-pitch pulley and the shifting assembly are separate devices, require a relatively large number of components, and involve a degree of complexity and cost unsuitable for many types of commercial applications.

It would therefore be advantageous to provide a control apparatuses and methods for use with a transmission that integrally combines the functions of both selective coupling and speed variation, thereby eliminating the number, complexity, and cost of transmission components required for the transmission.

SUMMARY

According to one embodiment, an apparatus for controlling a variable-speed transmission comprises a pulley structure and a coupling member. The pulley structure comprises first and second pulley members coupled for free rotation together about a common axis. The second pulley member is axially movable relative to the first pulley member and comprises a pulley contact surface disposed generally opposite to the first pulley member. The coupling member is rotatable about the axis, and comprises a coupling member contact surface disposed for selective frictional engagement by the pulley contact surface.

According to another embodiment, an apparatus for controlling a variable-speed transmission comprises a pulley structure and a coupling member. The pulley structure comprises first and second pulley members coupled for free rotation together about an axis. The second pulley member comprises a pulley contact surface disposed generally opposite to the first pulley member. The second pulley member is axially translatable relative to the first pulley member between a disengaged position and an engaged position. While in the engaged position, the second pulley member is axially translatable among variable speed positions. The coupling member is rotatable about the axis, and comprises a coupling member contact surface generally facing the pulley contact surface. At the disengaged position, the pulley contact surface is axially spaced from the coupling member contact surface. At the engaged position, the pulley contact surface frictionally engages the coupling member contact surface for enabling the pulley structure to rotatably drive the coupling member at variable speeds.

According to yet another embodiment, an apparatus for controlling a variable-speed transmission comprises a shaft, first and second pulley members coaxially disposed and freely rotatable about the shaft, and a coupling member communicating with the shaft for driving rotation thereof. The second pulley member is coupled to the first pulley member for rotation therewith and axial translation relative thereto along the shaft. The second pulley member comprises a pulley contact surface disposed generally opposite to the first pulley member. The coupling member comprises a coupling member contact surface. The pulley contact surface is axially movable into frictional engagement with the coupling member contact surface for transferring torque from the first and second pulley members, through the coupling member, and to the shaft.

In a method for controlling a variable-speed transmission, at least a portion of a rotating pulley structure is caused to engage a coupling member to enable the pulley structure to rotatably drive the coupling member. The pulley structure is adjusted to vary a speed at which the pulley structure drives the coupling member.

It is therefore an object to provide apparatuses and methods for controlling a variable speed transmission.

An object having been stated hereinabove, and which is achieved in whole or in part by the present disclosure, other objects will become evident as the description proceeds when taken in connection with the accompanying drawings as best described hereinbelow.

DETAILED DESCRIPTION

In the following description, control apparatuses are disclosed that can be employed in conjunction with a transmission. The control apparatuses are structured so as to function as both a coupling/decoupling mechanism and as a speed-varying mechanism. In one aspect, the control apparatus includes a structural feature or features functioning analogously to a clutch or other type of frictional engagement mechanism, enabling a torque input to be selectively coupled and decoupled from the transmission. In another aspect, the control apparatus includes a structural feature or features functioning analogously to a "variable-pitch" or "adjustable" pulley, enabling a driving member such as a belt carried by the pulley structure to be displaced at variable positions relative to the axis about which the pulley structure rotates.

Figure 1A:
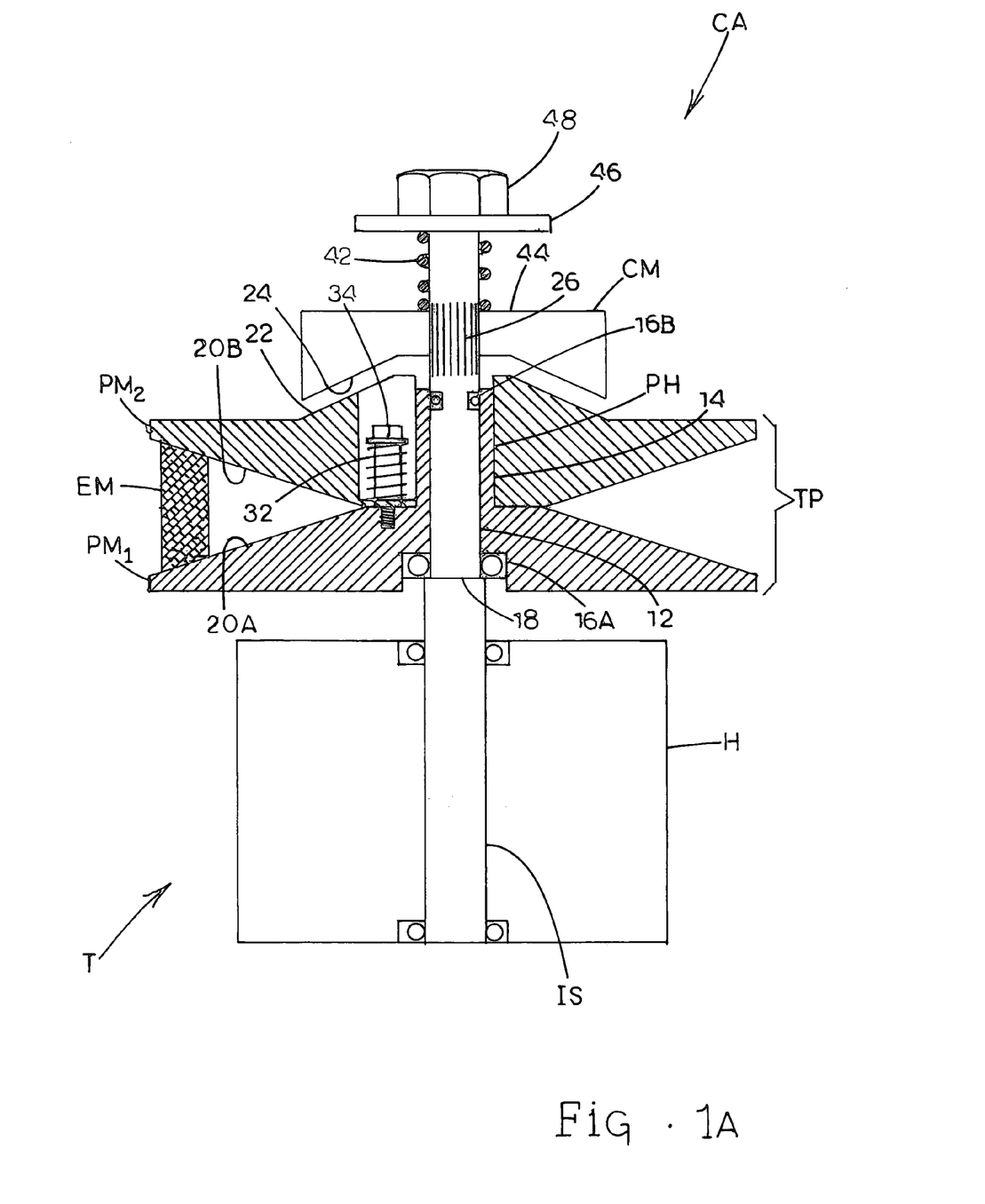
FIG. 1A is a partially cross-sectional side elevation view of a control apparatus as disclosed herein, in a neutral or disengaged position.

Referring now to FIG. 1A, a control apparatus for a transmission is illustrated according to an advantageous embodiment and is generally designated CA. Control apparatus CA is operatively associated with a transmission, generally designated T, that receives torque from an input shaft IS. Generally, transmission T includes a main housing H that can enclose suitable internal components, such as gears, shafts and the like, needed for various functions such as torque transfer, speed reduction, and providing different axes of rotation. It will become evident from the following description, however, that the use of control apparatus CA as disclosed herein eliminates the need for a clutch and/or shifting mechanism within main housing H.

Transmission T can have any configuration suitable for transferring torque from input shaft IS to any suitable output, such as one or more output shafts (not shown) connected to one or more driven wheels (not shown). For this purpose, input shaft IS in the present embodiment can receive torque from a suitable prime mover or motor M (FIG. 2), such as an electric motor or an internal combustion engine, through a suitable torque transferring means. In the advantageous embodiment illustrated in FIG. 1A, input shaft IS can be driven over a range of variable angular speeds by providing a torque transferring means that includes a uniquely structured and operative variable-pitch transmission pulley, generally designated TP. Transmission pulley TP carries and is driven by a suitable rotatable endless member EM such as a belt. In addition to transmission pulley TP, control apparatus CA can comprise a coupling member CM secured to input shaft IS. Coupling member CM interacts with transmission pulley TP in a manner described below.

Accordingly, in advantageous embodiments, transmission T can be a variable-speed transmission, and particularly a continuously variable-speed transmission. In a typical implementation, it is envisioned that transmission T can operate in conjunction with any suitable motor-powered machine, including one designed for mobility over a surface such as a self-propelled lawnmower. As appreciated by persons skilled in the art, by manipulating an appropriate control assembly communicating with transmission T (e.g., a hand-operated lever and associated linkage), an operator can control the output speed of a continuously variable-speed transmission, and thus the speed of one or more driving wheels if provided, over a continuous or substantially continuous range between a minimum low speed (which can be zero) and a maximum high speed. Generally, for the embodiments disclosed herein, the variation/adjustment of torque and/or transmission speed can be effected through the axial translation of one or more components of transmission pulley TP in a manner described below.

Figure 1C:
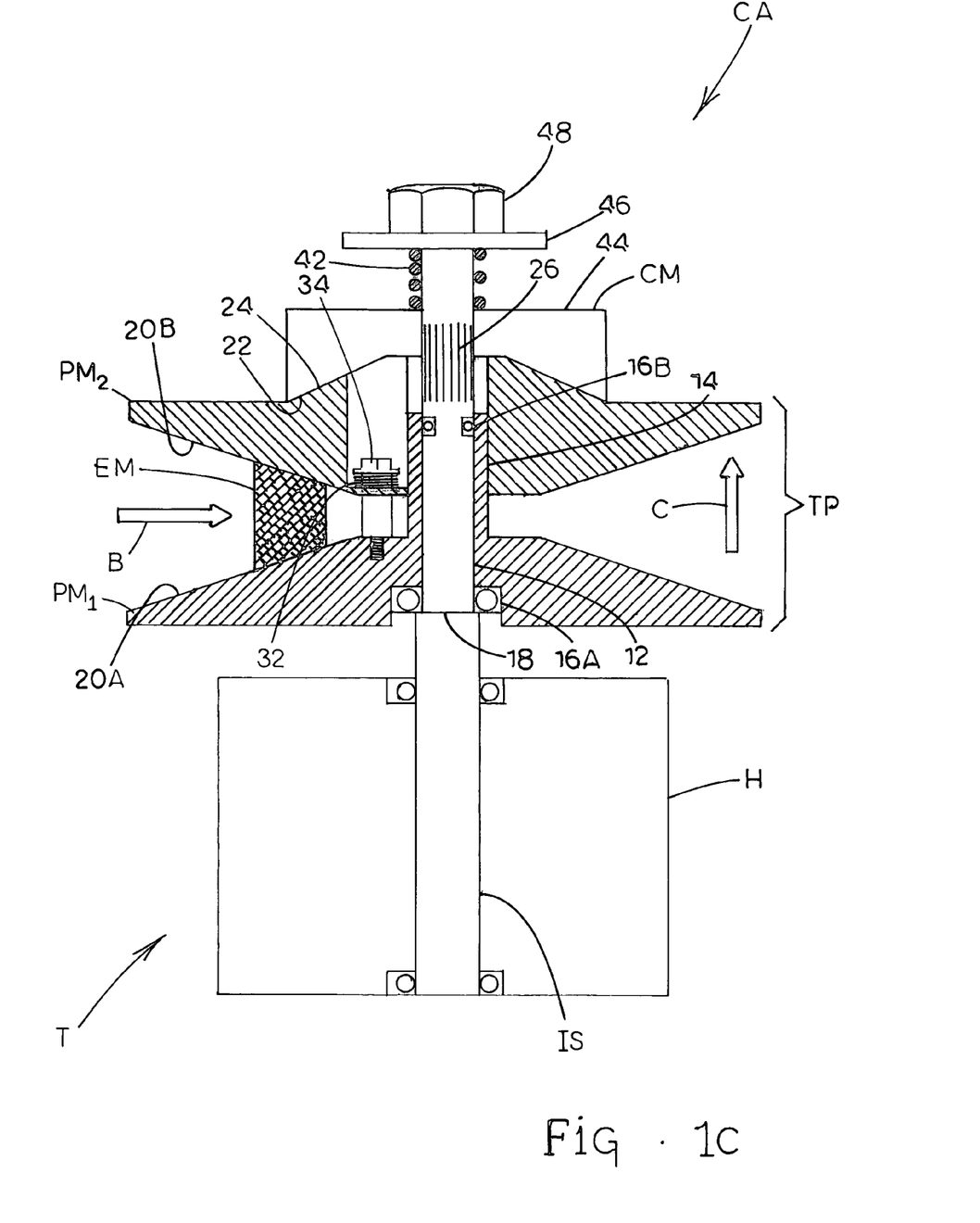
FIG. 1C is a partially cross-sectional side elevation view of the control apparatus in an engaged, HIGH speed position.
Figure 2:
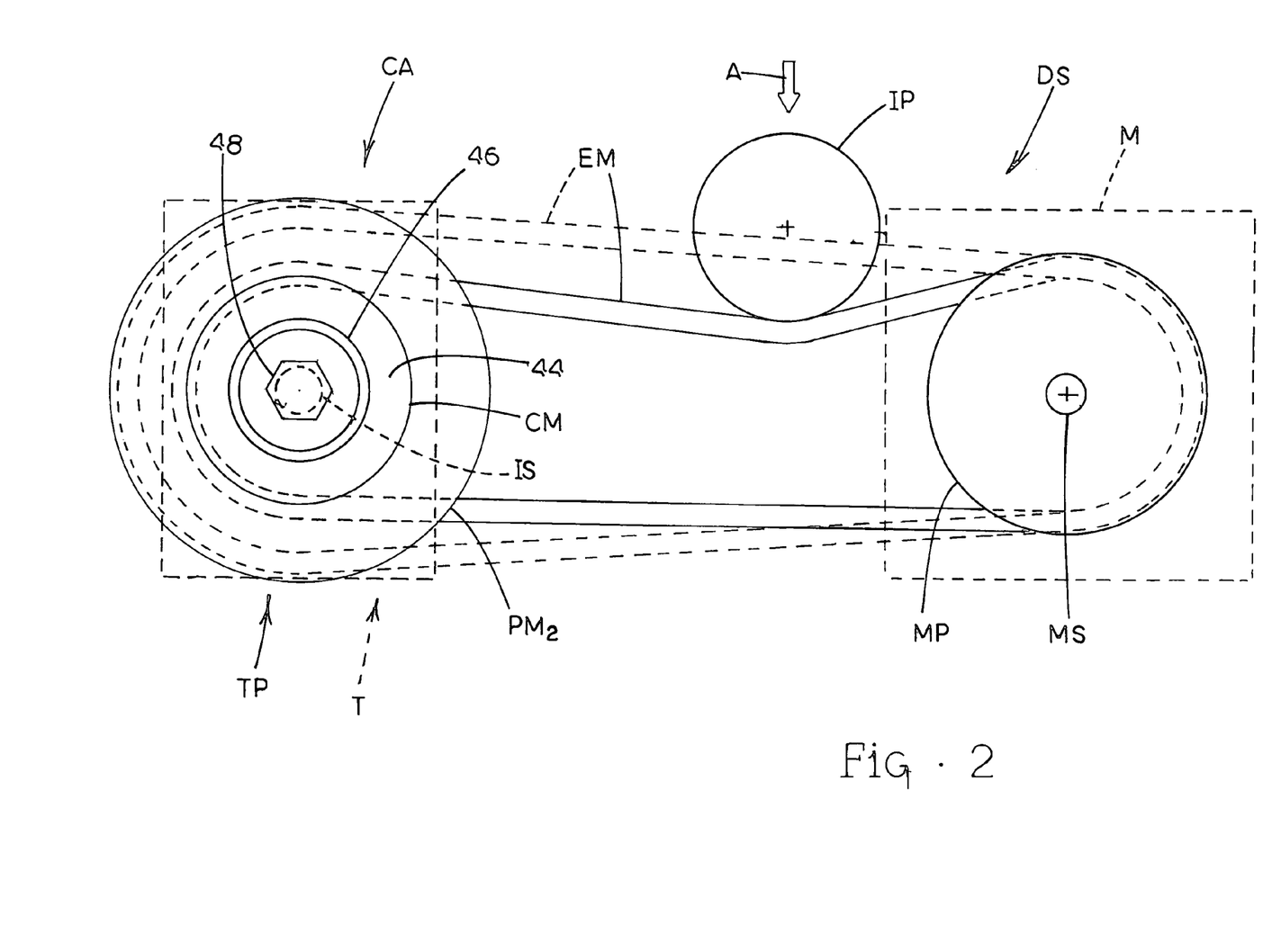
FIG. 2 is a schematic view of an example of a drive system in which a control apparatus according to the present subject matter can be implemented.

Referring now to FIG. 2, a drive system, generally designated DS, is schematically illustrated as an example of an implementation of control apparatus CA. In drive system DS, endless member EM is wrapped around a motor pulley MP as well as transmission pulley TP. FIG. 2 depicts the operation of transmission pulley TP as a variable-pitch pulley structure by illustrating endless member EM in two extreme (i.e., shallow and deep) positions that generally correspond to FIGS. 1A and 1C, respectively. Motor pulley MP rotates about a motor shaft MS that transfers torque produced by motor M. Through the rotation of endless member EM, the torque from motor shaft MS and motor pulley MP is transferred to transmission pulley TP. A speed-varying actuation device can be provided to control and adjust tension in endless member EM. By way of example, an idler or tensioning pulley IP is employed not only to maintain tension in endless member EM but also to deliberately adjust this tension in order to vary the pitch of transmission pulley TP, as described below. For this purpose, idler pulley IP is movable along a linear or non-linear path generally represented by arrow A. By way of additional example, motor M and transmission T could be mounted to a mower deck (not shown) of a lawnmower, in which case motor shaft MS of motor M could also rotatably drive a suitable cutting element (not shown) such as a blade or blades disposed within an interior of the mower deck. With motor M also transferring power to the driving wheel or wheels of the lawnmower through transmission T, the lawnmower could be self-propelled in response to control by the operator.

Referring back to FIG. 1A, in advantageous embodiments, transmission pulley TP is structured as a variable-pitch pulley as noted above. Transmission pulley TP comprises two flanges or halves, illustrated as a first pulley member $PM_1$ and a second pulley member $PM_2$. To enable the pitch or distance between first and second pulley members $PM_1$ and $PM_2$ to be varied, at least one of first and second pulley members $PM_1$ and $PM_2$ is axially translatable along input shaft IS relative to the other. In the present embodiment, first pulley member $PM_1$ is axially stationary and second pulley member $PM_2$ is axially movable. Unlike conventional variable-pitch pulleys that are directly attached to a shaft, neither first pulley member $PM_1$ nor second pulley member $PM_2$ in the present embodiment is directly attached to input shaft IS. Instead, both first and second pulley members $PM_1$ and $PM_2$ of transmission pulley TP are freely rotatable about input shaft IS. First pulley member $PM_1$ is mechanically referenced to second pulley member $PM_2$ by any suitable means that permits first pulley member $PM_1$ to rotate with second pulley member $PM_2$ while, at the same time, enabling the axial adjustment of first pulley member $PM_1$ relative to second pulley member $PM_2$. For instance, first pulley member $PM_1$ can include a central bore 12 coaxial to, but annularly spaced from, input shaft IS, and a splined pulley hub PH that at least partially defines bore 12. Second pulley member $PM_2$ can include a central bore 14 having complementary splines (not shown) that slidingly engage pulley hub PH. Alternatively, pulley hub PH could be integrated or otherwise associated with second pulley member $PM_2$. First pulley member $PM_1$ and pulley hub PH rotate freely about input shaft IS by any suitable means such as one or more bearings 16A and 16B (e.g., roller bearings). One or more of bearings 16A and 16B can additionally function as thrust bearings to retain first pulley member $PM_1$ in a stationary axial position, or additional bearings or other retaining means can be provided for this purpose. As an additional example, input shaft IS can have a reduction in diameter to form an annular shoulder or step 18 against which bearing 16A abuts.

Figure 1B:
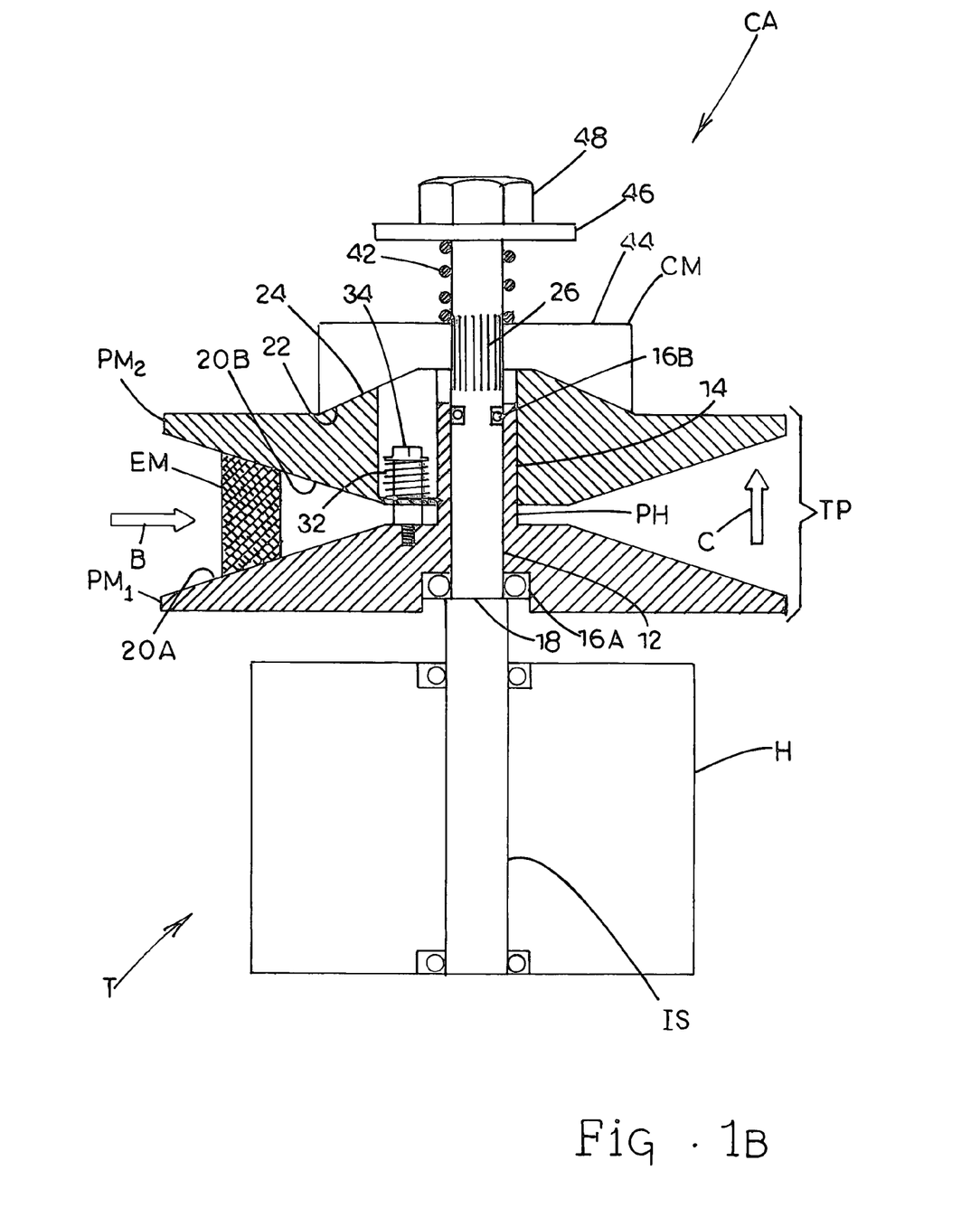
FIG. 1B is a partially cross-sectional side elevation view of the control apparatus in an engaged, LOW speed position.

As in the case of conventional variable-pitch pulleys, the pitch of transmission pulley TP can be adjusted to vary the radius of rotation of endless member EM carried thereby. As shown in FIG. 1A, the cross-section of endless member EM, and respective inside surfaces 20A and 20B of first and second pulley members $PM_1$ and $PM_2$, can be complementarily tapered to facilitate movement of endless member EM toward and away from input shaft IS. For instance, widening the distance between first and second pulley members $PM_1$ and $PM_2$ causes the endless member EM to make frictional contact with first and second pulley members $PM_1$ and $PM_2$ at a location radially closer to input shaft IS with which transmission pulley TP rotates. In FIGS. 1B and 1C, for example, arrow B generally represents radially inward displacement of endless member EM toward input shaft IS, and arrow C generally represents axial translation of second pulley member $PM_2$ away from first pulley member $PM_1$.

In advantageous embodiments, endless member EM can be actuated in a suitable manner to vary the pitch of transmission pulley TP by causing axial translation of second pulley member $PM_2$ relative to first pulley member $PM_1$. For instance, the movement of endless member EM toward input shaft IS forces second pulley member $PM_2$ to move away from first pulley member $PM_1$ through contact between endless member EM and inside surfaces 14A and 14B. An example of actuating endless member EM is illustrated in FIG. 2, in which idler pulley IP can be moved along a path such as arrow A to increase tension in endless member EM. Assuming a given frequency $\omega$ at which endless member EM is rotating under the driving force of motor M, the reduction in the radius r at which endless member EM turns relative to input shaft IS results in an increased angular velocity a at which input shaft IS is driven by endless member EM, according to the relation $\alpha=\omega/r$. It will be noted that for many implementations of variable-speed transmissions, endless member EM rotates at a constant frequency $\omega$ under normal operating conditions, due to the output speed of motor M being constant (e.g., 3100 rpm) under normal operating conditions for the purpose of operational-related optimization.

Although not specifically shown in the drawings, in some embodiments, motor pulley MP (FIG. 2) could also be a variable-pitch pulley. In this case, however, the pitch of motor pulley MP would vary inversely to that of transmission pulley TP to maintain tension in endless member EM and thus maintain the transfer of motor-produced torque to transmission pulley TP. For instance, the pitch of motor pulley MP would increase while the pitch of transmission pulley TP would decrease. In addition, pitch of motor pulley MP would vary on a different scale or proportion as compared with transmission pulley TP to enable the variance in the pitch of transmission pulley TP to adjust the speed ratio as between motor shaft MS and input shaft IS.

Referring again to FIG. 1A, additional features of control apparatus CA will now be described. Unlike conventional variable-pitch pulleys, transmission pulley TP functions not only to vary speed but also to completely couple/decouple motor-produced torque to/from input shaft IS. Accordingly, transmission pulley TP can be characterized as serving not only as a speed-varying mechanism, but also as a clutch or coupling mechanism for transmission T. For this purpose, the axially movable component of transmission pulley TP, which is second pulley member $PM_2$ in the illustrated embodiment, includes an outside surface that serves as a frictional pulley contact surface 22. The surface of coupling member CM facing second pulley member $PM_2$ serves as a frictional coupling member contact surface 24. By this configuration, increasing the pitch of transmission pulley TP eventually causes pulley contact surface 22 to come into frictional contact with, and thus engage, coupling member contact surface 24. Due to the resulting pressure imparted to coupling member contact surface 24 by pulley contact surface 22, rotation of transmission pulley TP forcibly can cause rotation of coupling member CM. Coupling member CM can be secured to input shaft IS for rotation therewith by any suitable means, such as mated splines 26, key and keyway, set screw and threaded bore, press fitting, or the like. Thus, frictional contact between pulley contact surface 22 and coupling member contact surface 24 enables the torque supplied to transmission pulley TP to be transferred to coupling member CM and input shaft IS, thereby driving the internal components of transmission T associated with input shaft IS.

As further shown in FIG. 1A, pulley contact surface 22 and coupling member contact surface 24 can have complementary profiles. Stated differently, at least a portion each of pulley contact surface 22 and coupling member contact surface 24 has a contour comprising one or more curved or linear sections. For example, in the illustrated embodiment, at least a portion each of pulley contact surface 22 and coupling member surface 24 is angled relative to the axis about which input shaft IS rotates. This profiled configuration is analogous to a cone clutch design which, in conventional implementations, is known for providing a smooth transition between engagement and disengagement. In the example illustrated in FIG. 1A, pulley contact surface 22 or at least a portion thereof is convex, and coupling member contact surface 24 or at least a portion thereof is concave. In alternative embodiments, however, pulley contact surface 22 can include the concavity and coupling member contact surface 24 can include the complementary convexity. Moreover, the embodiments herein are not limited to profiled frictional contact surfaces. That is, pulley contact surface 22 and coupling member contact surface 24 could each be flat. Furthermore, pulley contact surface 22 and coupling member contact surface 24 could each present complementary or mating features that do not rely solely on friction for engagement, such as teeth, pawls, dogs, or the like.

As additionally shown in FIG. 1A, control apparatus CA can include a biasing member for biasing second pulley member $PM_2$ toward first pulley member $PM_1$, and hence biasing control apparatus CA toward slower speeds and even complete disengagement if insufficient effort is made to actuate endless member EM so as to keep transmission pulley TP open. In the illustrated embodiment, the biasing member comprises a pulley spring 32 interconnected between first and second pulley members $PM_1$ and $PM_2$ and mounted around a bolt or other spring mounting member 34 extending between first and second pulley members $PM_1$ and $PM_2$. Spring mounting member 34 can be secured to both first and second pulley members $PM_1$ and $PM_2$, or secured to one while merely retained in a bore of the other. Particularly when control apparatus CA and transmission T are incorporated in a self-propelled machine, pulley spring 32 can be employed as a safety feature for increasing the effort required by an operator to actuate control apparatus CA (such as by actuating idler pulley IP shown in FIG. 2) to engage transmission T and subsequently increase speed. Other, alternative techniques for providing a biasing member could be provided for the function just described, now known or later developed, and as such fall within the scope of the embodiments disclosed herein.

Continuing with FIG. 1A, control apparatus CA can include a second biasing member for biasing coupling member CM toward second pulley member $PM_2$, and hence biasing control apparatus CA toward slower speeds. In the illustrated embodiment, this second biasing member comprises a coupling member spring 42 disposed about input shaft IS. Coupling member spring 42 is interposed between, and in contact with, an outside surface 44 of coupling member CM opposite to coupling member contact surface 24 and a suitable retaining component 46 such as a washer. Retaining component 46 abuts a nut 48 threaded on input shaft IS. Particularly when control apparatus CA and transmission T are incorporated in a self-propelled machine, coupling member spring 42 can be employed as a safety feature for increasing the effort required by an operator to actuate control apparatus CA to increase speed. Moreover, in a case where transmission T is provided in a mobile machine, coupling member spring 42 can be employed to provide resistance against abrupt acceleration so as to prevent the machine from jumping forward immediately upon engagement of pulley contact surface 22 with coupling member contact surface 24.

In the embodiment illustrated in FIG. 1A, transmission pulley TP is generally interposed between main housing H of transmission T and coupling member CM. However, as can be appreciated by persons skilled in the art, the ability of control apparatus CA to operate outside main housing H permits the components of control apparatus CA to be oriented differently if desired. For instance, the illustrated arrangement of control apparatus CA could be inverted relative to input shaft IS such that coupling member CM is interposed between transmission pulley TP and main housing H, with transmission pulley TP being farthest from main housing H. In such a case, coupling member spring 42 and retaining component 46 could be suitably secured to input shaft IS between coupling member CM and main housing H, or coupling member spring 42 could be retained directly by main housing H. Such required modifications or alterations to the exemplary embodiment illustrated and described herein are readily apparent to persons skilled in the art without undue experimentation, and fall within the scope of the embodiments disclosed.

Referring now to FIGS. 1A, 1B and 1C, the operation of control apparatus CA will now be described. FIGS. 1A, 1B and 1C respectively illustrate three primary states attainable through actuation of control apparatus CA. As noted above, the actuation of control apparatus CA among these states can be effected by any suitable means. In the example given in FIG. 2, idler pulley IP is provided to adjust the position and/or tension of endless member EM. Idler pulley IP can be actuated by an operator of a machine in which control apparatus CA operates, such as a lawnmower. For example, idler pulley IP can be actuated through manipulation by the operator of a suitable handle or handle-mounted control component (e.g., knob, lever, or the like, not shown) that can be linked to idler pulley IP directly or through a mechanical, electromechanical, electronic or wireless linkage. It can be appreciated that, because control apparatus CA is capable of both coupling/decoupling transmission T and varying the speed of transmission T, only a single operator-manipulatable control component would be needed for actuating idler pulley IP or an equivalent device and hence actuating control apparatus CA. By contrast, many conventional transmission-related assemblies require separate control means for coupling/decoupling transmission T and varying the speed of transmission T.

FIG. 1A illustrates a disengaged, OFF or neutral state. In the disengaged state, a gap (axial distance) exists between pulley contact surface 22 and coupling member contact surface 24. Thus, transmission pulley TP can rotate freely without contacting coupling member CM, and the path of power transfer between motor M (FIG. 2) and transmission T is decoupled. In the disengaged state, transmission pulley TP can be fully "closed", the pitch between first and second pulley members $PM_1$ and $PM_2$ can be at a minimum, and the radius of rotation of endless member EM as it is carried by first and second pulley members $PM_1$ and $PM_2$ can be at a maximum. In addition, the speed of transmission T is zero because it is not being actively driven. Alternatively, if control apparatus CA has been actuated from an engaged state to the disengaged state, the speed of transmission T can slow down to zero because it is no longer being actively driven. Pulley spring 32 assists in maintaining closure of transmission pulley TP while in the disengaged state.

FIG. 1B illustrates an engaged or ON state, as well as a LOW speed state. In comparison to FIG. 1A, endless member EM has moved radially inwardly toward input shaft IS, and second pulley member $PM_2$ has moved axially away from first pulley member $PM_1$. These movements can be effected, for example, by actuating idler pulley IP (FIG. 2) to deflect and/or increase tension in endless member EM. In the engaged state, the gap shown in FIG. 1A no longer exists, as pulley contact surface 22 has been brought into frictional engagement with coupling member contact surface 24. Thus, the rotation of transmission pulley TP (as driven by endless member EM) rotates coupling member CM and thus input shaft IS, thereby coupling the path of power transfer between motor M (FIG. 2) and transmission T. At the point of engagement, transmission pulley TP is partially "open", the pitch between first and second pulley members $PM_1$ and $PM_2$ has increased, and the radius of rotation of endless member EM has decreased. Moreover, at the point of engagement, the radius of rotation of endless member EM has the largest value possible while second pulley member $PM_2$ is in contact with coupling member CM. This is because for any larger value for the radius of rotation, second pulley member $PM_2$ will be closer to first pulley member $PM_1$ and hence will not contact coupling member CM, as shown for example in FIG. 1A.

Thus, at the point of engagement, the resulting speed at which transmission T is actively driven by motor M (FIG. 2) is at a minimum (i.e., the LOW speed state).

FIG. 1C illustrates the engaged or ON state, but at a HIGH speed state. In comparison to FIG. 1B, endless member EM has moved further radially inwardly toward input shaft IS, and second pulley member $PM_2$ has moved further axially away from first pulley member $PM_1$. These movements can be effected, for example, by actuating idler pulley IP (FIG. 2) by a greater amount to deflect and/or increase tension in endless member EM. As control apparatus CA is actuated into the HIGH speed state from the LOW speed state (FIG. 1B) and intermediate states, coupling member spring 42 ensures that the pressure applied to coupling member contact surface 24 by pulley contact surface 22 increases, thereby maintaining good frictional engagement and suppressing slippage between pulley contact surface 22 and coupling member contact surface 24 at these higher speeds. [Dean, is this correct?] Moreover, as noted above, coupling member spring 42 can prevent an abrupt transition to a high speed soon after the time of engagement. At the HIGH speed state, transmission pulley TP is fully "open", the pitch between first and second pulley members $PM_1$ and $PM_2$ has increased to a maximum, the radius of rotation of endless member EM is at a minimum, and the resulting speed at which transmission T is driven by motor M (FIG. 2) is at a maximum.

In the operation of control apparatus CA, it can be appreciated that a potentially infinite number of intermediate engaged states, and thus rotational speeds, are available between the LOW speed state illustrated in FIG. 1B and the HIGH speed state illustrated in FIG. 1C. These intermediate conditions are attainable through manipulation of the actuating device chosen for cooperation with control apparatus CA, such as idler pulley IP shown in FIG. 2 and any associated linkages, handle, or the like provided for the specific embodiment.

As indicated above, control apparatus CA can be utilized in conjunction with any motor-powered machine that utilizes a transmission T. In particular, control apparatus CA is useful when implemented in self-propelled machines, of either the walk-behind or riding type, such as lawnmowers, snow blowers, leaf blowers, yard vacuums, tillers, edgers, seeders, trimmers, aerators, fertilizers, palette trucks, graders, vehicles for transportation, pavement and construction machines, and the like. Moreover, control apparatus CA can be utilized in conjunction with any non-mobile machine or tool that includes a rotating component requiring speed adjustment and an ON/OFF, clutching-type capability.

It will be understood that various details of the presently disclosed subject matter may be changed without departing from the scope of the subject matter. Furthermore, the foregoing description is for the purpose of illustration only, and not for the purpose of limitation.

What is claimed is:

1. An apparatus for controlling a variable-speed transmission, comprising:

(a) a pulley structure comprising first and second pulley members for free rotation together about an axis, the second pulley member comprising a pulley contact surface disposed generally opposite to the first pulley member, the second pulley member being axially translatable relative to the first pulley member between a disengaged position and an engaged position and, while in the engaged position, among variable speed positions; and (b) a coupling member rotatable about the axis and comprising a coupling member contact surface at least generally facing the pulley contact surface wherein, at the disengaged position, the pulley contact surface is axially spaced from the coupling member contact surface and, at the engaged position, the pulley contact surface frictionally engages the coupling member contact surface for enabling the pulley structure to rotatably drive the coupling member at variable speeds.

2. The apparatus according to claim 1 comprising an endless member contacting respective inside surfaces of the first and second pulley members for rotatably driving the pulley structure, the endless member radially actuatable relative to the axis, wherein the second pulley member is axially translatable to the engaged position from the disengaged position in response to radial actuation of the endless member toward the axis and, while in the engaged position, the second pulley member and the coupling member are axially translatable away from the first pulley member from a minimum speed position to a maximum speed position in response to radial actuation of the endless member further toward the axis.

3. The apparatus according to claim 1 comprising a shaft disposed along the axis, wherein the coupling member is secured to the shaft and the shaft is drivable by the pulley structure in response to engagement of the pulley contact surface with the coupling member contact surface.

4. The apparatus according to claim 3 comprising an endless member contacting respective inside surfaces of the first and second pulley members for rotatably driving the pulley structure, the endless member radially actuatable relative to the shaft, wherein the second pulley member is axially translatable to the engaged position from the disengaged position in response to radial actuation of the endless member toward the shaft and, while in the engaged position, the second pulley member and the coupling member are axially translatable away from the first pulley member from a minimum speed position to a maximum speed position in response to radial actuation of the endless member further toward the shaft.

5. An apparatus for controlling a variable-speed transmission, comprising:

(a) a shalt;

(b) a first pulley member coaxially disposed and freely rotatable about the shalt;

(c) a second pulley member coaxially disposed about the shaft and coupled to the first pulley member for rotation therewith and axial translation relative thereto along the shaft, the second pulley member comprising a pulley contact surface disposed generally opposite to the first pulley member; and (d) a coupling member communicating with the shaft for driving rotation of the shaft, wherein the pulley contact surface is axially movable into frictional engagement with the coupling member for transferring torque from the first and second pulley members, through the coupling member, and to the shaft.

6. The apparatus according to claim 5 comprising an endless member contacting respective inside surfaces of the first and second pulley members for rotatably driving the pulley structure, the endless member radially actuatable relative to the shaft.

7. The apparatus according to claim 6 comprising a speed-varying actuation device for actuating the endless member radially relative to the shaft, wherein the second pulley member is axially movable in response to radial actuation of the endless member for engaging the pulley contact surface with the coupling member contact surface and for varying a speed of the shaft during engagement.

8. The apparatus according to claim 7 wherein the speed-varying actuation device is an adjustably movable idler pulley contacting the endless member.

9. The apparatus according to claim 5 comprising a speed-varying actuation device for causing axial translation of the second pulley member relative to the first pulley member.

10. The apparatus according to claim 9 wherein the speed-varying actuation device comprises a tension control device for adjustably contacting an endless member driving the first and second pulley members.

11. The apparatus according to claim 10 wherein the tension control device comprises an adjustably movable idler pulley.

12. The apparatus according to claim 5 comprising an endless member contacting respective inside surfaces of the tirst and second pulley members for rotatably driving the pulley structure, the endless member radially actuatable relative to the shaft, wherein the second pulley member is axially movable in response to radial actuation of the endless member for engaging the pulley contact surface with the coupling member contact surface and for varying a speed of the shaft during engagement.

\* \* \* \* \*